(12) United States Patent
Van Berkel et al.

(10) Patent No.: US 8,256,378 B2
(45) Date of Patent: Sep. 4, 2012

(54) CLOSING DEVICE FOR MILKING DEVICE

(75) Inventors: Sebastianus Arnoldus Nicolaas Maria Van Berkel, Delft (NL); Gerard Mostert, Rozenburg (NL)

(73) Assignee: Lely Patent N.V., Maassluis (NL)

( * ) Notice: Subject to any disclaimer, the term of this patent is extended or adjusted under 35 U.S.C. 154(b) by 353 days.

(21) Appl. No.: 12/508,599

(22) Filed: Jul. 24, 2009

(65) Prior Publication Data

US 2010/0175623 A1 Jul. 15, 2010

(30) Foreign Application Priority Data

Jul. 28, 2008 (NL) ..................................... 1035773

(51) Int. Cl.
*A01J 7/00* (2006.01)
(52) U.S. Cl. .................................................. 119/14.18
(58) Field of Classification Search ............... 119/14.01, 119/14.02, 14.08, 14.18; 137/237, 239, 240; 134/166 R, 169 R, 169 C, 166 C; 251/142, 251/149, 149.8, 318
See application file for complete search history.

(56) References Cited

U.S. PATENT DOCUMENTS

| | | | | |
|---|---|---|---|---|
| 2,680,445 | A * | 6/1954 | Hemminger | 134/58 R |
| 3,461,845 | A * | 8/1969 | Peterson | 119/14.18 |
| 3,670,744 | A | 6/1972 | Bender | |
| 4,034,713 | A | 7/1977 | Umbaugh | |
| 4,168,677 | A | 9/1979 | Brown | |
| 4,175,514 | A * | 11/1979 | Souza et al. | 119/14.08 |
| 4,222,346 | A | 9/1980 | Reisgies | |
| 4,462,425 | A * | 7/1984 | Mehus | 137/624.18 |
| RE31,659 | E * | 9/1984 | Brown | 119/14.18 |
| 4,572,105 | A | 2/1986 | Chowdhury et al. | |
| 5,881,669 | A * | 3/1999 | van den Berg et al. | 119/14.03 |
| 5,896,828 | A * | 4/1999 | Kronschnabel et al. | 119/14.46 |
| 6,079,359 | A * | 6/2000 | van den Berg | 119/14.01 |
| 6,997,135 | B1 * | 2/2006 | DeWaard | 119/14.44 |
| 8,033,247 | B2 * | 10/2011 | Torgerson et al. | 119/14.47 |
| 2010/0139723 | A1 * | 6/2010 | Torgerson et al. | 134/57 R |
| 2010/0154900 | A1 * | 6/2010 | Torgerson et al. | 137/511 |

* cited by examiner

*Primary Examiner* — Trinh Nguyen
(74) *Attorney, Agent, or Firm* — Coraline J. Haitjema; David P. Owen; Hoyng Monegier LLP

(57) ABSTRACT

Closing device assembly for systems for milking animals, provided with at least one primary passage and at least two secondary passages, wherein the primary and secondary passages are provided with first and second connecting edges, respectively, with respective openings each having an axis, further provided with at least one closing device for at least one unused, non-selected secondary passage, which closing device is provided with a closing edge, wherein of each set of connecting edges and closing edges to be connected to each other in each case at least one is provided with a seal, wherein the closing device assembly further comprises a first drive unit for mutual displacement of the first connecting edge and the second connecting edge of a selected secondary passage from an uncoupled position in which the axes of their openings are not in line with each other to a position in which the axes of their openings are in line, a coupling line, with each other, and a second drive unit for bringing said connecting edges against each other.

37 Claims, 11 Drawing Sheets

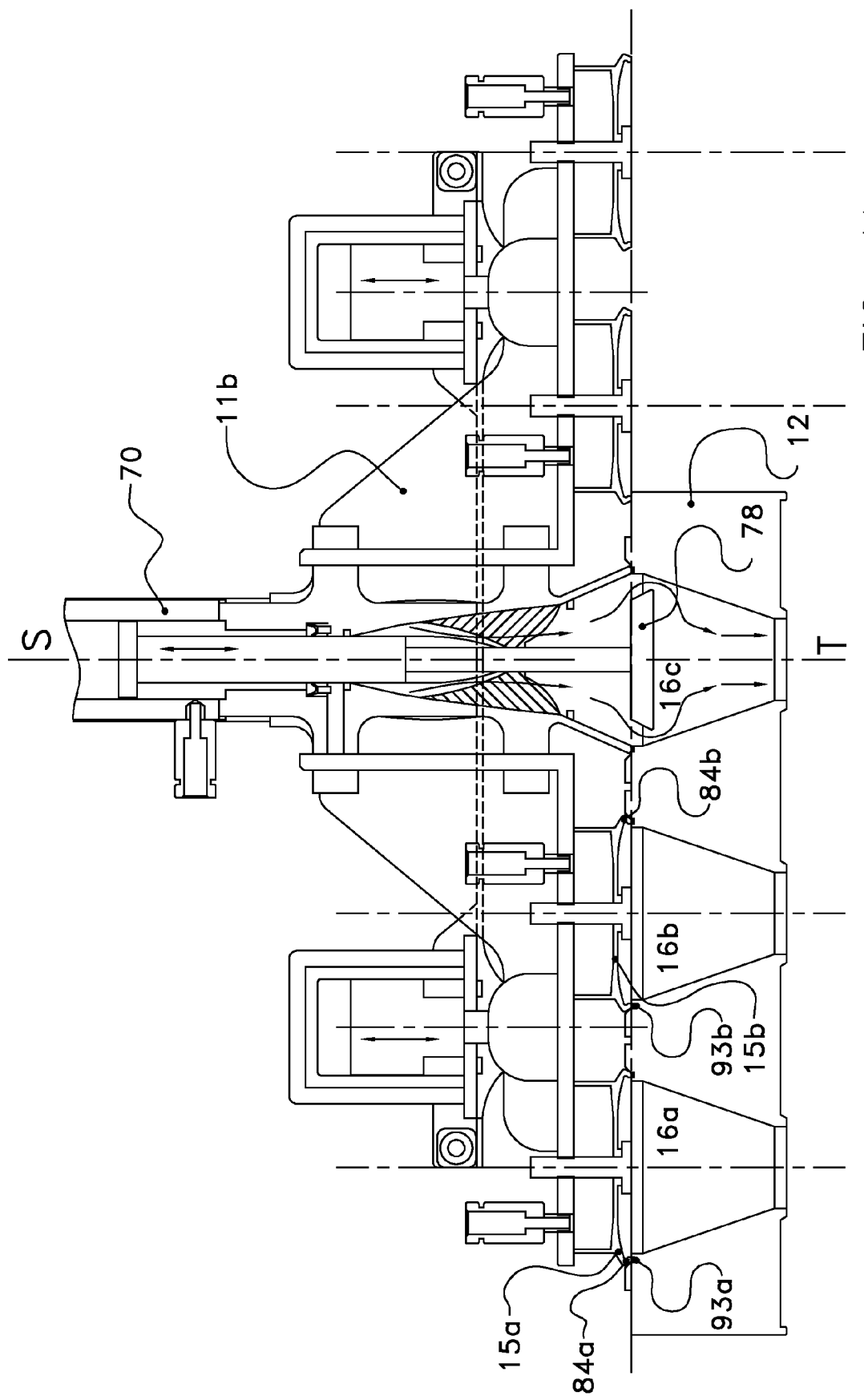

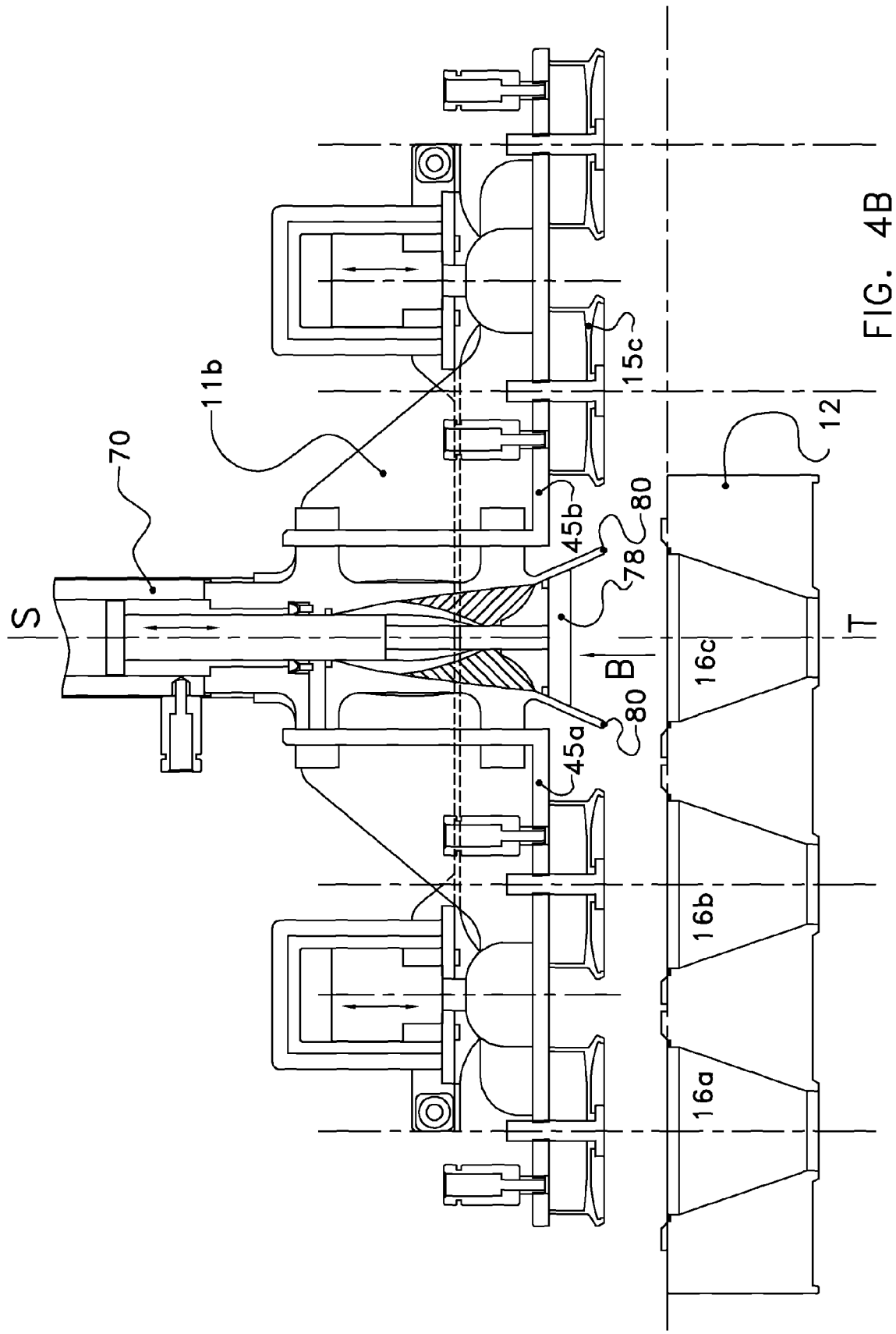

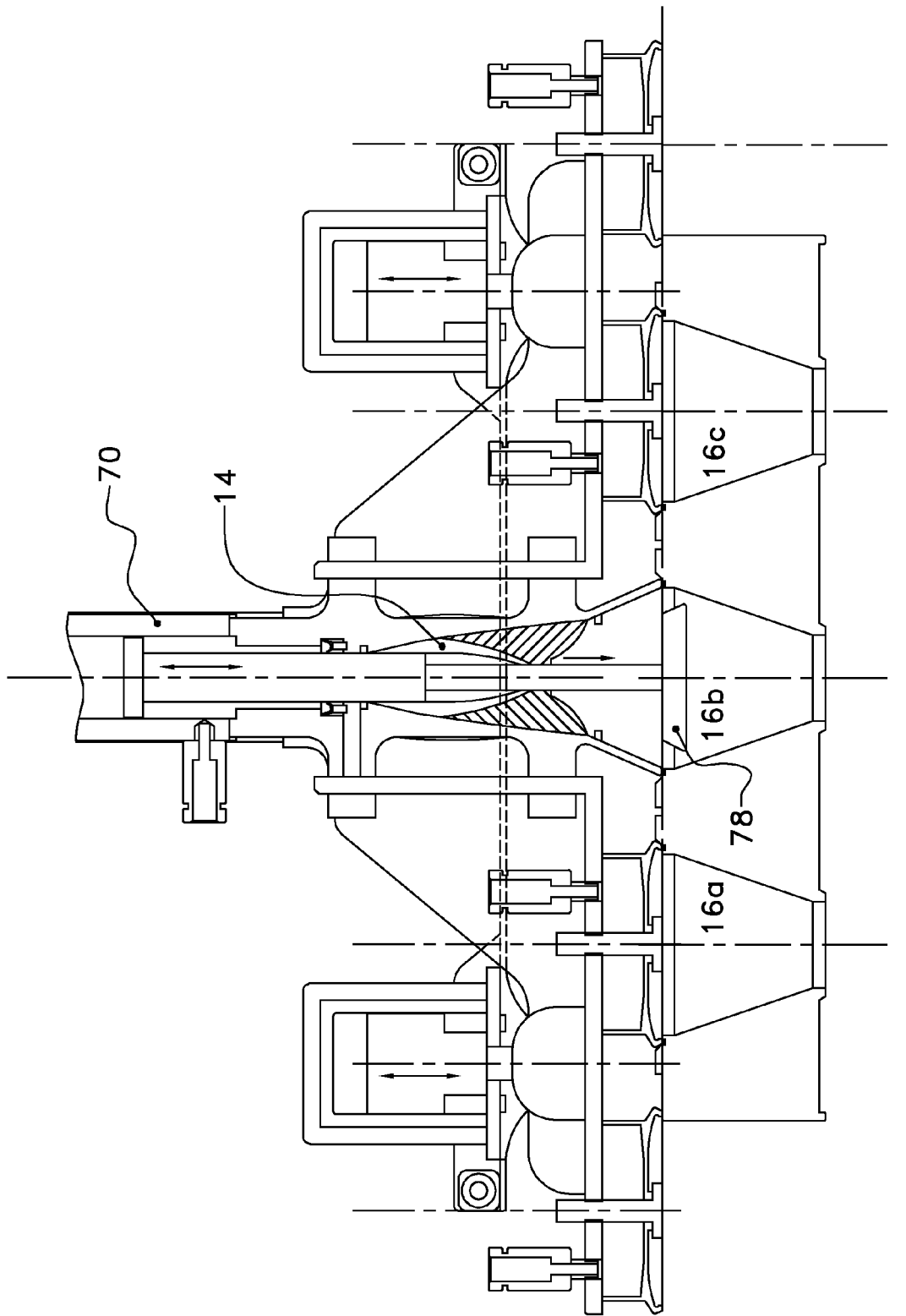

CLOSING DEVICE FOR MILKING DEVICE

This application claims priority from Netherlands application no. 1035773 filed on Jul. 28, 2008, the contents of which are hereby incorporated by reference in their entirety.

BACKGROUND OF THE INVENTION

1. Field of the Invention

The invention relates to a closing device for a milking device and to a milking device provided with one or a plurality of such closing devices.

2. Description of the Related Art

In milking devices a milk line leads from one or more milk taking devices for taking milk from animals, such as milking robots, via a milk jar, to a central, cooled milk storage. For hygienic reasons, a frequent cleaning of the milk line is required.

In one approach, a discharge line is connected for this purpose, by means of a three-way valve, in the milk line portion shortly upstream of the milk tank. The discharge line leads to the sewer. After reversing the three-way valve in order to close the passage to the milk tank, cleaning liquid is supplied at the entrance of the milk line, which cleaning liquid subsequently flows via the three-way valve and the discharge line into the sewer.

In another approach, as shown in U.S. Pat. No. 4,222,346, there is disposed in the milk line a slide valve, the slide of which is provided with a passage having a connection to the upstream portion of the milk line that leads to a milk claw. The (relatively stationary) house of the valve, in which the slide is slidable in a reciprocating manner, is provided with two passages which connect to the downstream portion of the milk line and a conduit to a source of rinsing liquid, respectively. The slide is slidable between a milking position in which the milk line is in the flow through position, a rinsing position in which the upstream portion is in connection with the passage to the conduit to the source of rinsing liquid, and a neutral drainage position situated therebetween in which the downstream portion of the milk line and the conduit of the source of rinsing liquid are closed and the upstream portion of the milk line opens in a cavity in the slide valve. Sealing of the passage to the downstream portion of the milk line with respect to the slide takes place by means of an O-ring along which the slide is moved. Sealing of the passage for the rinsing liquid with respect to the slide takes place by means of a hollow, spring-loaded teflon plug.

Another slide valve having a milk line connection provided on the slide forms the subject of U.S. Pat. No. 4,034,713.

Hygiene in milk line systems is subjected to strict standards. Rinsing liquid should be prevented from entering the milk line portion that leads to the milk storage.

BRIEF SUMMARY OF THE INVENTION

It is an object of the invention to provide a closing device for a milking device, by means of which the connection of two passages in the closing device, coupled to each other for conveying a fluid, such as rinsing liquid, can be sealed in a highly reliable manner.

It is an object of the invention to provide a closing device for a milking device by means of which unused passages, in particular during the rinsing of a milk passage to a milk storage, can be sealed in a highly reliable manner.

It is an object of the invention to provide a closing device for milking devices in which control of the effectiveness of seals is facilitated.

It is an object of the invention to provide a milking device comprising one or more closing devices by means of which one or more of the aforementioned objects is/are achieved.

From one aspect, the invention provides a closing device assembly for systems for milking animals, provided with at least one primary passage and at least two secondary passages, wherein the primary and secondary passages are provided with first and second connecting edges, respectively, with respective openings each having an axis, further provided with at least one closing device for at least one unused, non-selected secondary passage, which closing device is provided with a closing edge, wherein of each set of connecting edges and closing edges to be connected to each other in each case at least one is provided with a seal, wherein the closing device assembly further comprises first drive unit for mutual displacement of the first connecting edge and the second connecting edge of a selected secondary passage from an uncoupled position in which the axes of their openings are not in line with each other to a position in which the axes of their openings are in line, a coupling line, with each other, and second drive unit for bringing said connecting edges against each other. During the displacement by the first drive unit the connecting edges may be situated in axial direction at a distance from each other, as a result of which the seals are less loaded during the reversal of the closing device, so that it will be possible for them to be effective in a reliable manner over a longer period of time. The second drive unit ensures that a sealed connection is still achieved. The second drive unit may, if desired, also be used for a displacement in opposite direction, when the connection has to be undone, but for this purpose other means, such as a reset spring, are conceivable as well.

In a simple embodiment, the first drive unit is arranged for mutual displacement of the two connecting edges in a direction transverse to the coupling line, in particular in a rectilinear movement, as known per se in the case of the aforementioned slide closing devices.

The second drive unit may be arranged for mutual displacement of the two connecting edges in a direction parallel to, preferably in line with, the coupling line, so that sliding forces on the seal are minimized.

The closing device assembly according to the invention may be provided with a control unit for controlling in succession the first and second drive unit, via an intermediate position in which the axes of their openings are in a coupling line with each other but in which the two connecting edges are at a distance from each other. The displacement is then stepwise, in which case the drive unit become active one after another.

In a further development of the closing device assembly according to the invention, it comprises, analogously to the above described facility for mutual displacement of the connecting edges, third drive unit for bringing the closing edge and the second connecting edge of the unused secondary passage at a distance in front of each other and in line with each other and fourth drive unit for bringing said closing edge and said connecting edge against each other, by means of which comparable advantages are obtained. In an embodiment thereof, there is provided a control unit for controlling in succession the third and fourth drive unit.

In an embodiment, the first and third drive units are both the same drive unit, and the second and fourth drive units are also both the same drive unit.

The sealing can be promoted further if the second and/or the fourth drive unit are arranged to press the two connecting edges, the closing edge and the connecting edge, respectively, against each other. During the displacement by the first/third drive unit, this pressure is absent, as a result of which wear is limited.

In a further embodiment, the closing device assembly comprises a first carrier for carrying the primary passage and the closing device. In this case, the first connecting edge and the closing edge may be carried by the first carrier, in a manner reaching away from the first carrier, while leaving clear a mutual interspace. A leak passage between the used passage and the unused passage(s) is thus prevented. The interspace actually functions as an extra security. Moreover, said interspace makes it possible to ascertain more quickly, if desired, whether and where, despite the features according to the invention to enhance the reliability of the device, leakage is involved.

A comparable advantage may be obtained if the closing device assembly comprises a second carrier for carrying the secondary passages, wherein the second connecting edges are carried by the second carrier in a manner reaching away from the second carrier, while leaving clear a mutual interspace.

In an embodiment thereof, around the first connecting edge and the closing edge and/or around the second connecting edges a free space may be left clear.

The connecting edge of the primary passage and/or the secondary passage may, for example, be formed on a spout.

In order to prevent an unwanted leakage from the primary passage when the latter is not being used, also during a displacement, the primary passage may be provided with a valve. This also prevents rinsing water in the secondary passage from flowing back into the primary passage. Instead thereof there may be provided a fifth drive unit which acts in two opposite directions, so that the valve when being out of operation can be opened in order to be cleaned. The fifth drive unit may comprise a double-acting cylinder by means of which the position can be controlled in an optimum manner. The valve may be provided with a drainage on the reverse side thereof, i.e. on the side of the primary passage, so that an insufficient internal closing can be observed.

In an embodiment, each closing device is provided with a cover, so that the control of leakage, if any, is facilitated.

Each closing device may be provided with a supply for cleaning or rinsing agent to the side of the closing device which faces the secondary passage closed thereby, for cleaning that side.

For each unused secondary passage there may be provided a closing device. In an embodiment thereof, there is provided, on both sides of the primary passage, at least one closing device for closing an unused secondary passage, as a result of which the displacements during the reversal can be kept limited.

From another aspect, the invention provides a closing device assembly for conduits for fluid flows in a milking device for animals, comprising at least one primary port which is connected to a respective source or destination of fluid and at least two mutually parallel secondary ports which are each connected to respective sources or destinations of fluid, wherein the primary port is provided on a first closing device portion and the secondary ports are provided on a second closing device portion, wherein the primary port and the secondary port are provided with primary and secondary openings, respectively, which are able to be connected to each other at their edges along a respective connecting surface, wherein the first closing device portion is provided with at least one closing means for closing an unused secondary port, wherein in each case at least one of the ports or closing means to be connected to each other is provided with a seal, further comprising a first drive unit for displacing the two closing device portions with respect to each other in a first direction with a direction component parallel to the connecting surface and a second drive unit for displacing the two closing device portions with respect to each other in a second direction with a direction component perpendicular to the connecting surface.

The second drive unit may be arranged to press the two closing device portions towards each other. The first direction may be parallel to the connecting surface, the second direction may be parallel to the normal on the respective connecting surface. The first closing device portion may comprise a frame which carries the closing means and the primary port, wherein the closing means has an edge which is able to co-operate in a closing manner with the opening edge of a secondary port, wherein between the edge of the closing means and the opening edge of the primary port free spaces are left clear. The second closing device portion may comprise a frame which carries the secondary ports, wherein between the opening edges of the secondary ports free spaces are left clear.

From another aspect, the invention provides a closing device assembly for conduits for fluid flows in a milking device for animals, comprising at least one primary port which is connected to a respective source or destination of fluid and at least two mutually parallel secondary ports which are each connected to respective sources or destinations of fluid, comprising drive system for selectively connecting the primary port to the one or the other secondary port, wherein in the connected position the respective primary and secondary port define a mutual connecting surface in which a seal is provided, wherein the drive system is arranged for mutual displacement of the ports to be connected to each other with a first direction of approach parallel to the connecting surface and a second direction of approach perpendicular to the connecting surface. The drive system may be arranged to have the displacement along the first direction of approach followed by the displacement along the second direction of approach.

From a further aspect, the invention provides a closing device assembly for conduits for fluid flows in a milking device for animals, comprising at least one primary port which is connected to a respective source or destination of fluid and at least two mutually parallel secondary ports which are each connected to respective sources or destinations of fluid, wherein the primary port is provided on a first closing device portion and the secondary ports are provided on a second closing device portion, wherein the primary port and the secondary port are provided with primary and secondary openings, respectively, which are able to be connected to each other at their edges, wherein the first closing device portion is provided with at least one closing means for closing an unused secondary port, wherein the closing means has an edge which is able to co-operate in a closing manner with the opening edge of a secondary port, wherein in each case at least one of the primary and secondary ports to be connected to each other and at least one of the closing means and the secondary port to be closed thereby is provided with a seal, wherein the first closing device portion comprises a frame which carries the closing means and the primary port, wherein between the edge of the closing means and the opening edge of the primary port free spaces are left clear and/or wherein the second closing device portion comprises a frame which carries the secondary ports, wherein between the opening edges of the secondary ports free spaces are left clear.

A leak passage between the used port and the unused port(s) is thus prevented. The interspace actually functions as an extra security. Moreover, said interspace makes it possible to ascertain more quickly, as and when applicable, whether and where a leakage is involved.

In a closing device assembly according to the invention, the primary port or passage may be an inlet port and the secondary ports or passages may be outlet ports. The primary port or passage may selectively be connected to an animal to be milked and to a supply for cleaning/rinsing fluid. For cleaning/rinsing, one secondary port or passage may be connected to a milk storage container and another secondary port or passage may be connected to a discharge point.

In an embodiment, the secondary ports or passages are stationary, in which case the primary port or passage will be displaced in an absolute sense.

From a further aspect, the invention provides a milking device for milking animals, provided with one or more closing device assemblies according to the invention.

It should be noted that the first and second drive units may coincide. It is further pointed out that the third and fourth drive units may coincide.

The aspects and features described in this description and the claims of the application and/or shown in the figures of this application may, where possible, also be used separately from each other. These separate aspects may be the subject of split patent applications aimed at them. This holds in particular for the features and aspects which are described per se in the dependent claims.

BRIEF DESCRIPTION OF THE DRAWINGS

The invention will be explained with reference to a number of exemplary embodiments shown in the accompanying figures, in which.

DESCRIPTION OF ILLUSTRATIVE EMBODIMENTS

The following is a description of certain embodiments of the invention, given by way of example only and with reference to the drawings.

Figure 1:
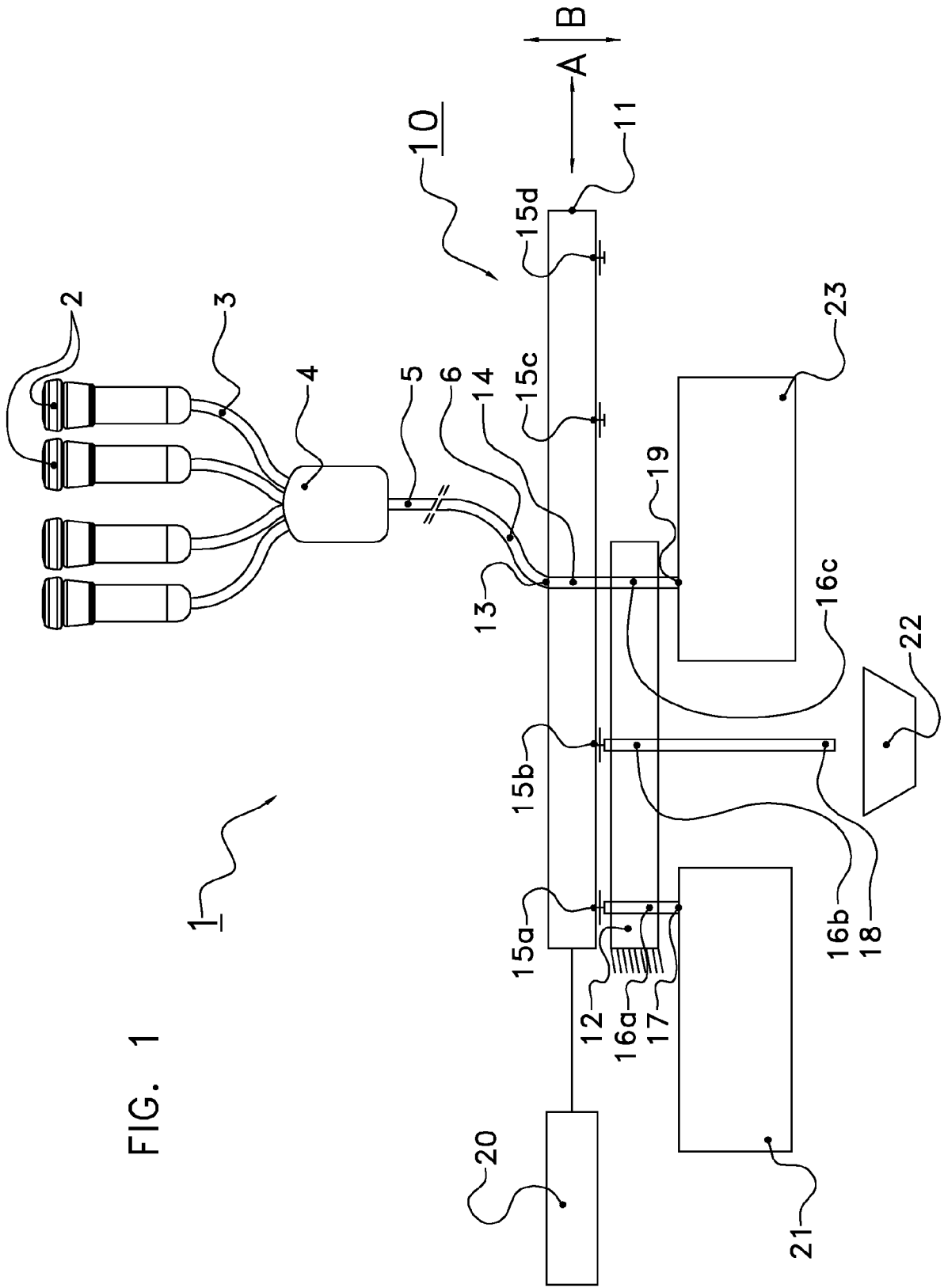
FIG. 1 shows a schematic simplified view of a milking device according to the invention, in the milking position.
Figure 2:
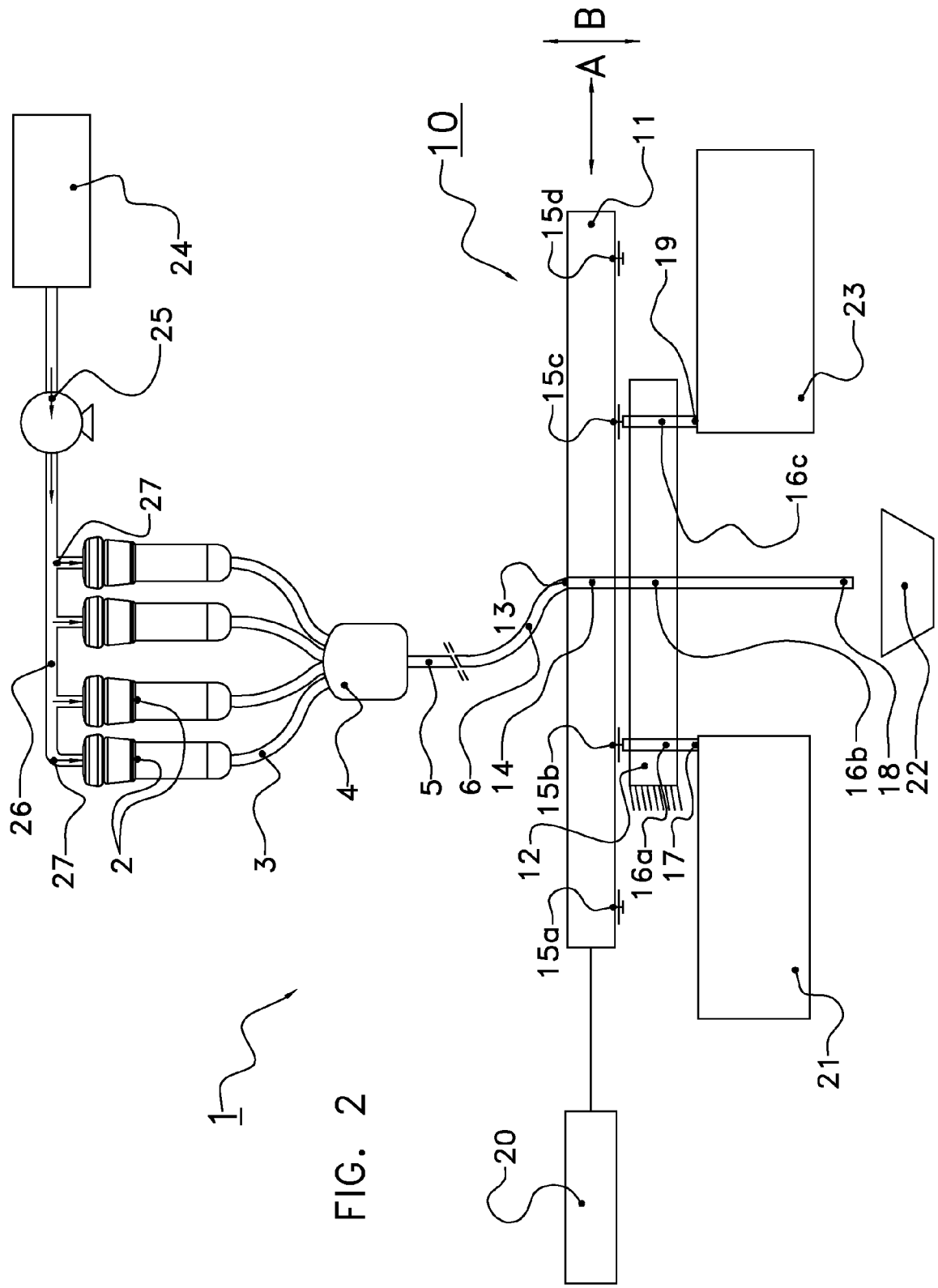
FIG. 2 shows the milking device according to FIG. 1 in the rinsing position.

The milking device 1 of FIGS. 1 and 2 comprises a not further shown milking robot which comprises four teat cups 2. The teat cups 2 can be attached to the teats of a cow by the milking robot. The teat cups 2 are connected to respective milk lines 3 which lead to a milk jar 4. From there the milk is led further through a central milk line 5 which, by means of its end portion 6, is permanently connected to the closing device assembly 10.

The closing device assembly 10 comprises a first frame 11 and a second frame 12, which, as will be elucidated hereinafter, are mutually displaceable in the directions A and B. In this example, the first frame 11 is displaceable in the directions A and B and carries a connection 13 for connection with the end portion 6 of the central milk line 5. The connection 13 continues in a primary passage or port 14. The first frame 11 further carries four closing devices 15a-d, in each case two on both sides of the passage 14. In this example, the second frame 12 is stationary and carries three secondary passages 16a-c, of which passage 16a is permanently connected to connection 17 for a storage 21 for colostrum, passage 16b is permanently connected to supply line 18 to a sewer 22 and passage 16c is permanently connected to connection 19 of milk storage 23.

There is provided a programmable control unit 20 for automatically and pneumatically controlling in the desired manner, by means of a control valve system, various cylinders in the closing device assembly 10, such as for the displacements in the direction A and B.

In FIG. 1, the closing device assembly 10 has been brought into a milking position in which the primary passage 14 connects to the secondary passage 16b and milk from the teat cups 2 flows through the central milk line 5, the passages 14 and 16b to the milk storage 23. When milking of colostrum is involved, the closing device assembly 10 is adjusted in such a manner that the primary passage 14 connects to the secondary passage 16a.

In FIG. 2, the closing device assembly 10 has been brought into a rinsing position in which the primary passage 14 connects to the secondary passage 16b and rinsing liquid from storage 14 flows, under the influence of pump 25, via rinsing liquid line 26 and nozzles 27 through the teat cups 2 (disconnected from the teats), the central milk line 5, the passages 14 and 16b and the discharge line 18 to the sewer 22.

Figure 3A:
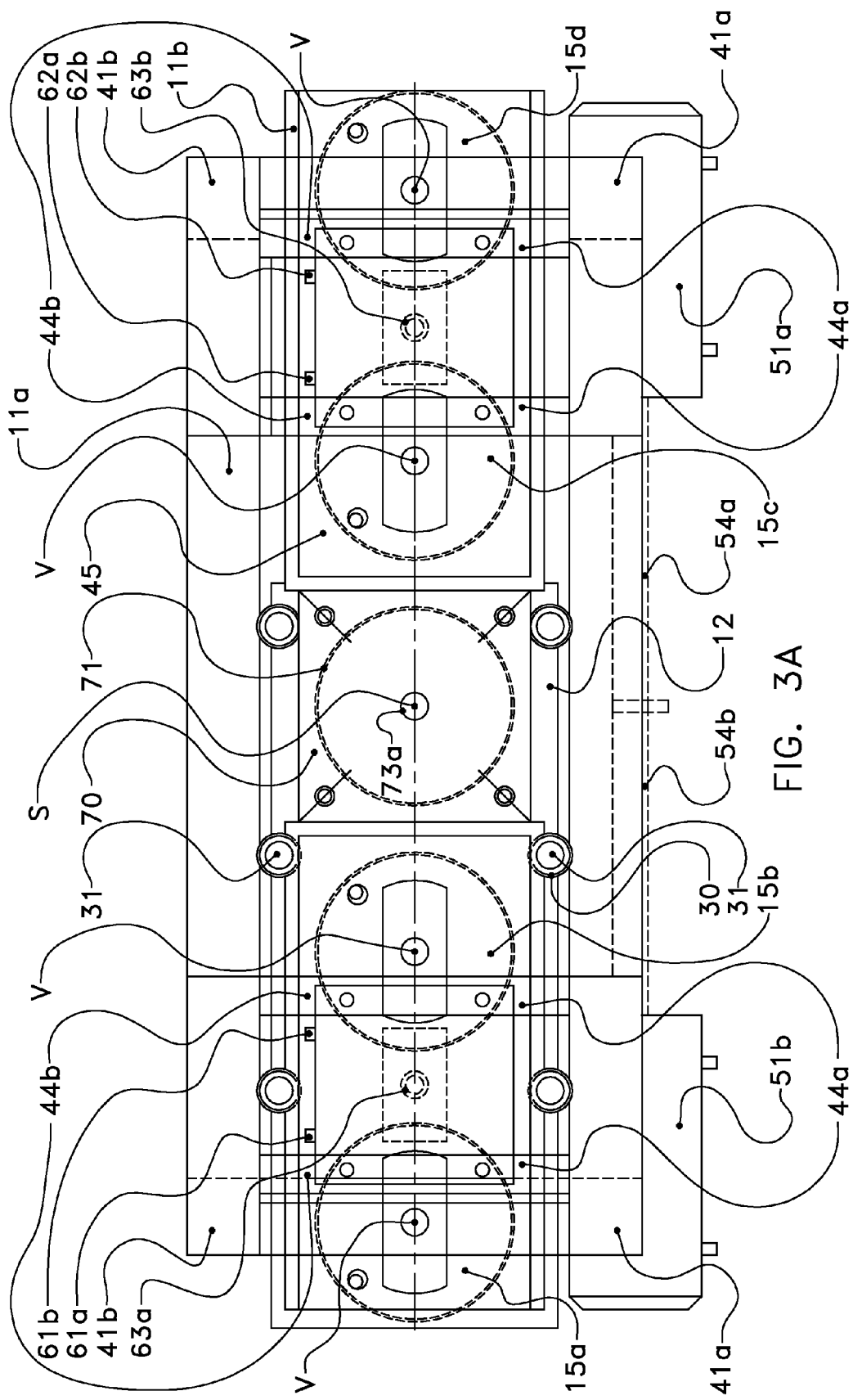
FIGS. 3A-C show a top view, a side view and a cross-sectional view, respectively, of a closing device assembly suitable for the milking device of FIGS. 1 and 2, and FIGS. 4A-F show the closing device assembly of FIGS. 3A-C, in a number of successive positions of use.
Figure 3B:
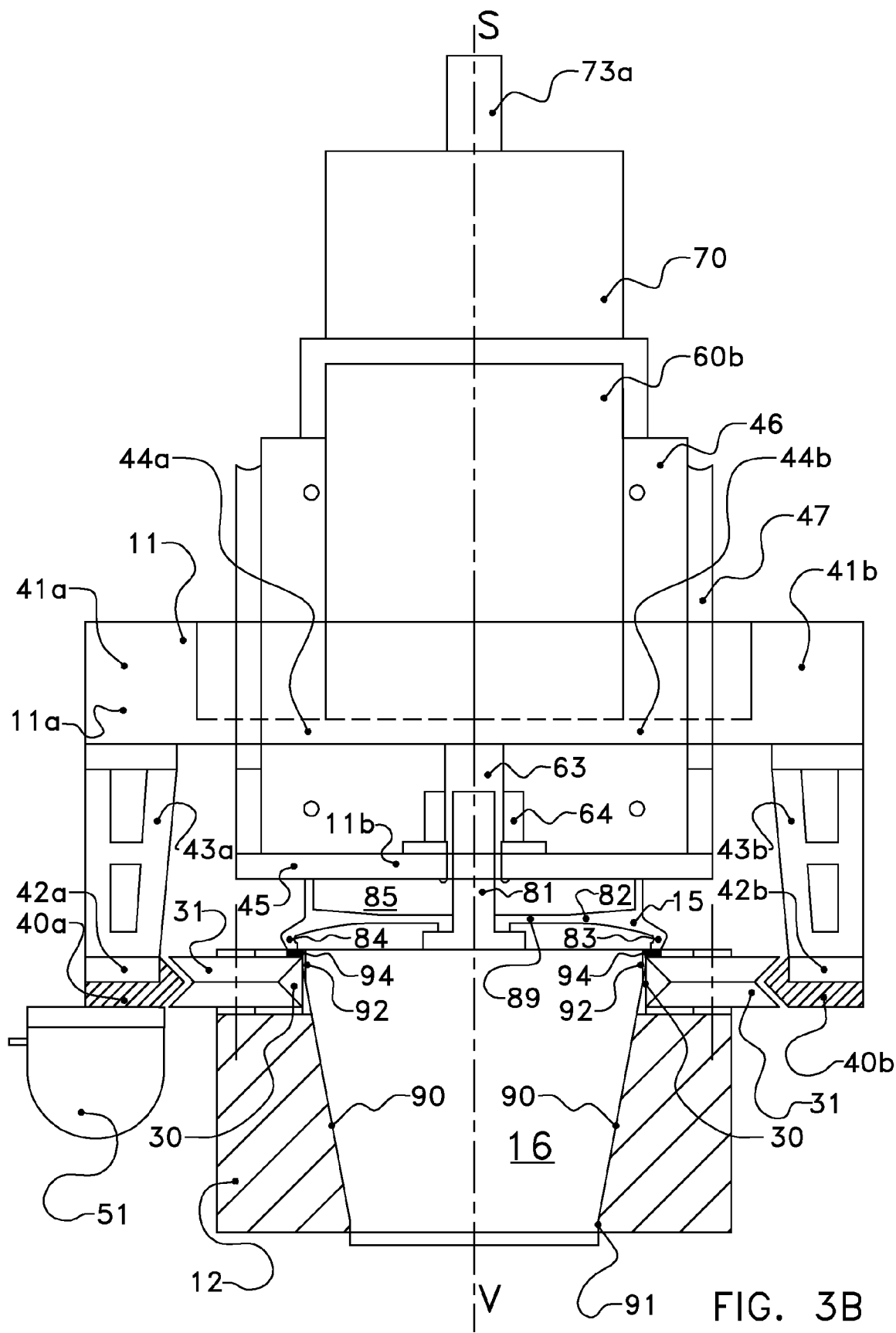
Figure 3C:
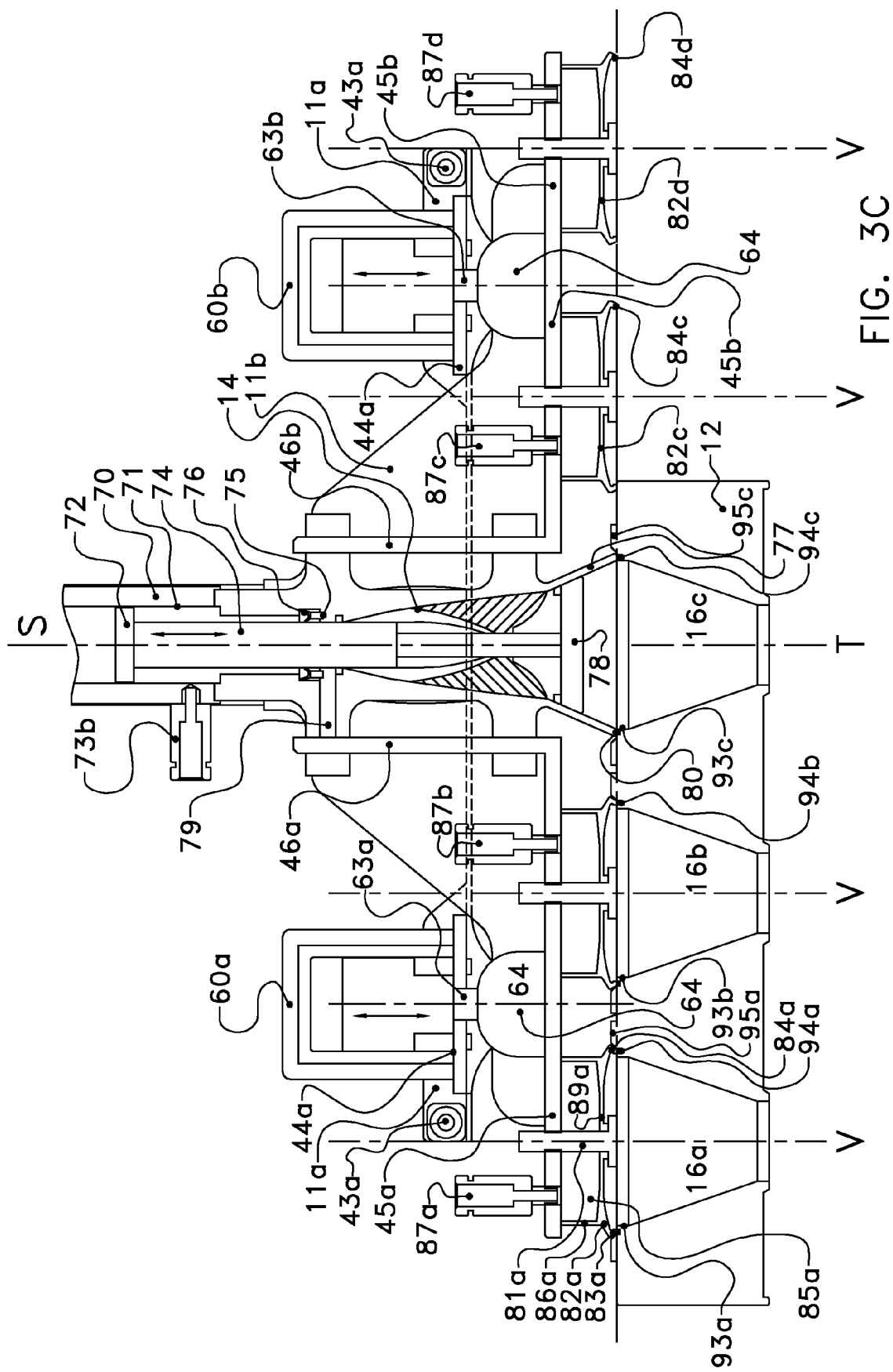

The closing device assembly 10 is shown in further detail in FIGS. 3A-C. The second frame 12 is substantially block-shaped and provided at its longitudinal edges with recesses 30 in which guide wheels 31 are bearing-supported in a freely rotatable manner. The second frame 12 comprises three passages 16-c, each defined by a truncated-cone-shaped wall 90a-c, cylinder-shaped external end wall 91a-c and cylinder-shaped interior end wall 92a-c, which define the connecting edge 93a-c with the connecting opening with axes S. On each connecting edge 93a-c there is provided a somewhat projecting sealing ring 94a-c which projects upwardly from the upper side of the block 12. Around the outside of the sealing ring 94a-c there is formed thereon in a concentric manner a projecting guiding edge 95a-c. In FIG. 3B, for the sake of clearness, the suffixes a, b, etc. for a number of components have been omitted.

The first frame 11 has an open structure and comprises two portions, namely a carriage 11a, for the displacement in the direction A, and a lifting portion 11b, for the displacement in the direction B.

Carriage 11a comprises two rails 40a,b which co-operate in a guiding manner with the wheels 31 during the displacement in the direction A and support the carriage 11a. The rails 40a,b are fastened to longitudinal girders 42a,b which are each provided at their ends with supports 43a,b. The supports 43a,a and 43b,b located on either side are fastened to each other by cross bolts. The supports are provided with transversely extending support forks 44a,b. The rails 40a,b and the longitudinal girders 42a,b are further held together by drawbars (not further shown).

In the region of an end of the rail 40a there is fastened to the carriage 11a a support plate on which a drive unit in the form of a cylinder 51a is rigidly fastened. The cylinder 51a belongs, together with a cylinder 51b which is rigidly fastened on the block 12, to a mechanism for performing the displacement of the carriage 11a in the direction A. The cylinders 51a,b are double-acting and provided with connections 52a,b and 53a,b for pneumatic conduits to the control valve system of the central control unit 20 in order to be able to be operated one after the other, so that three positions are possible, which correspond to a position of passage 14 in front of passage 16a, 16b or 16c, respectively. The (non-shown) pistons in the cylinders 51a,b are connected with each other by a piston rod 54a,b.

Cylinders 60a,b function as a drive unit, fastened on support forks 44a,b of the supports 43a,b. The cylinders 60a,b serve for relative displacement of the lifting portion 11b with respect to the carriage 11a in the direction B. The cylinders 60a,b are double-acting and are provided with connections 61a,b and 62a,b for pneumatic conduits to the control valve system of the central control unit 20 in order to be operated simultaneously. Piston rods 63a,b of the cylinders 60a,b are rigidly fastened at their ends, by means of plates 64, to the lifting portion 11b, in particular to flanges 45a,b of the lifting portion 11b. The flanges 45a,b form a unit with upright cross plates 46a,b, which unit is entirely stiffened by side plates 47a,b and 48a,b.

A valve house 70 is rigidly mounted between the cross plates 46a,b, which valve house forms inter alia the primary passage 14. The valve house 70 further comprises a cylinder 71 which is double-acting and which is provided with connections 73a,b for pneumatic conduits to the control valve system of the central control unit 20. A piston 72 is located inside the cylinder 71, which piston 72 is fastened on a rod 74 which extends through a seal 76 in the rod guide 75. A valve 78 is fastened at the lower end of the rod 74, which valve 78 is movable upwardly and downwardly in a spout 77 defined by a truncated-cone-shaped wall, between a closed position in which the valve 78 abuts in a closing manner against the internal surface of the spout 77, and an open position. The spout 77 has a connecting edge 80 which defines an end opening provided with an axis T. Immediately above the seal 76 there is provided a so-called bleed duct 79 in order to be able to observe when the seal 76 is leaking On each of the flanges 45a,b there are in each case provided two closing devices 15a,b and 15c,d, which each comprise a cover 82a,b and 82c,d which are fastened to the flanges 45a,b by means of bolts 81a,b and 81c,d, which extend through upper walls 89a-d thereof. The covers 82a-d have hanging down walls 83a-d with lower edges or closing edges 84a-d, which are provided with axes V. At the upper side of the covers 82a-d there are formed chambers 85a-d which are upwardly delimited by the lower side of the flanges 45a,b, sidewardly by walls 86a,b which press in a sealing manner (with an O-ring) against the lower side of the flanges 45a,b, and downwardly by the aforementioned upper walls 89a-b. The chambers 85a-d can be provided with rinsing liquid via connections 87a-d for suitable conduits. In the region of the passage of the bolts 81a-d through the upper walls 89a-d of covers 82a-d there are provided spray ducts 88a-d for cleaning the lower side of the covers 82a-d, controlled by the control unit 20.

As shown in FIG. 3C, the closing devices 15a-d and the spout 77 extend downwardly at a mutual distance while leaving clear interspaces, in which situation they are, at least at their edges 84a-d and 80, circumferentially freely located.

Figure 4C:
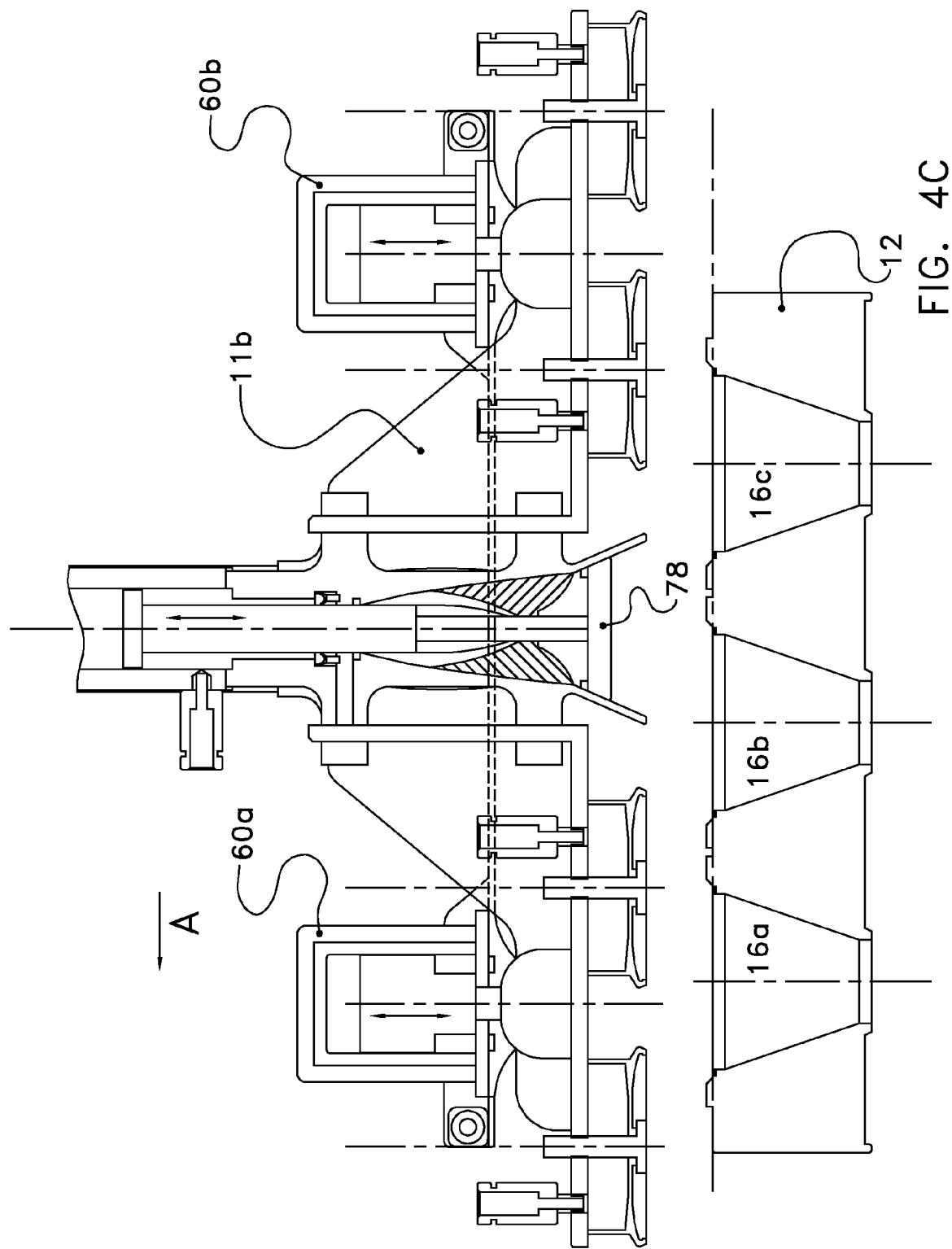

FIG. 4A shows the milking position of the closing device assembly 10, which figure substantially corresponds to FIG. 3C, but the valve 78 is now in the opened position. In the region of a connecting surface the connecting edge 80 is pressed against the seal 94c, the axes T and S being in said region in line (coupling line) with each other, perpendicular to the connecting surface. In the region of connecting surfaces, the closing edges 84a and 84b, too, are pressed against the seals 94a and 94b of connecting edges 93a and 93b, while, in this case too, the axes S and T are in line with each other. As a result thereof, the passages 16a and 16b are sealed. Supplied milk flows through the primary passage 14 and the secondary passage 16c to the milk storage 23.

When the milking is ended and the teat cups 2 come loose from the teats, the control unit 20 will operate the cylinder 71 in order to bring the valve 78 into the closed position (as illustrated in FIG. 3C). Subsequently, the control unit 20 operates the cylinders 60a and 60b in order to lift the lifting portion 11b with the flanges 45a,b freely in the direction B, in a direction in line with the coupling line and axes T and S in that region, in which case the closing edges 84a,b will come at a distance from the connecting edges 93a,b and the connecting edge 80 of the primary passage 14 will come at a distance from the connecting edge 93c. Then, the situation of FIG. 4B has been reached. It should be noted that in FIGS. 4B-D the cylinder casings of the cylinders 60a,b and the supports 43 are depicted too high: they maintain with frame portion 11a their vertical position with respect to block 12. Furthermore, in the figures it will be possible for the block 12 to be somewhat shorter if it is desired to exclude contact between the unused closing devices 15a-d and the block.

Figure 4D:
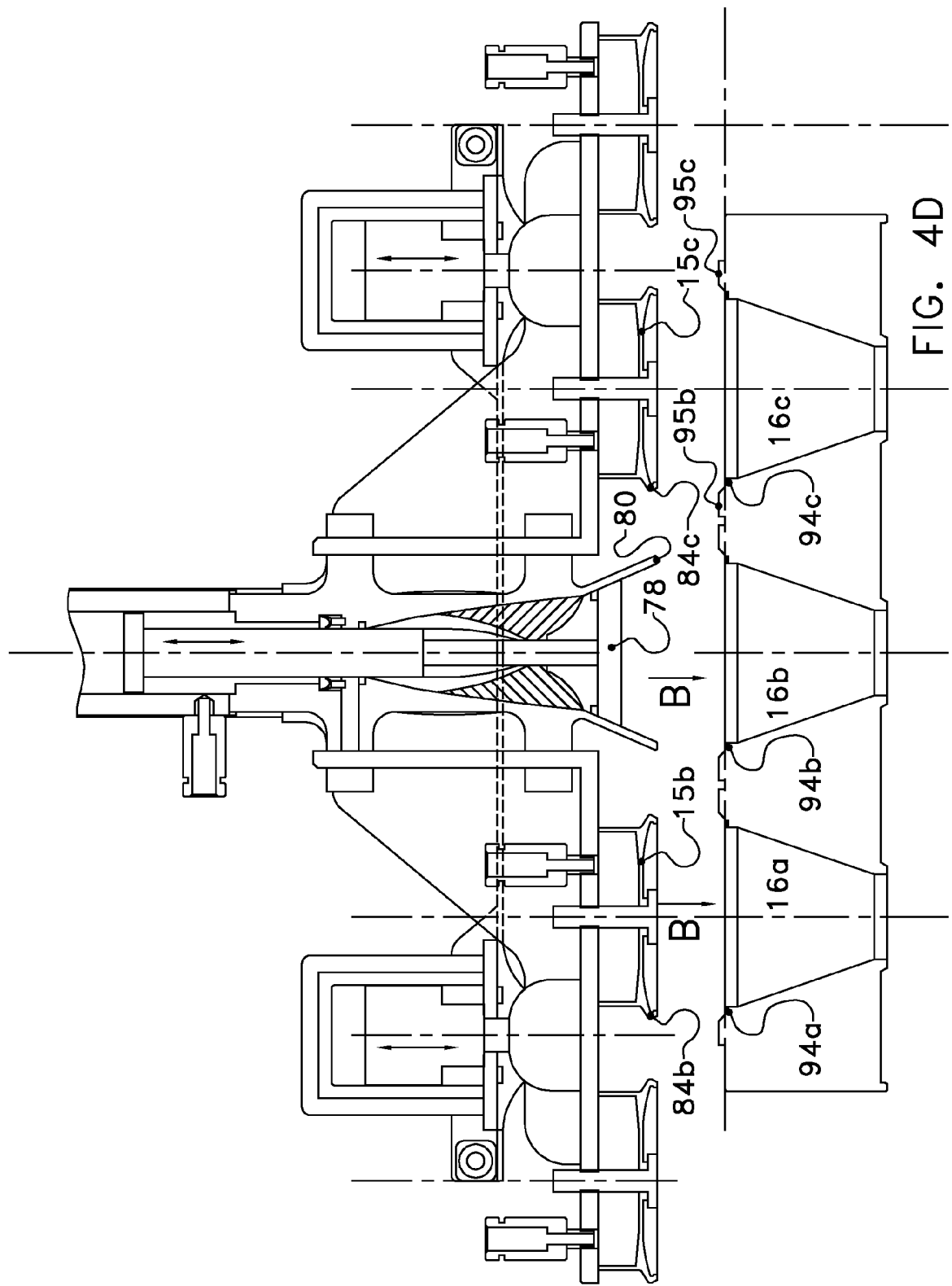

By reversing in the control valve system, the control unit 20 subsequently operates the cylinder 51a, as a result of which the carriage 11a is displaced with respect to the block 12 in the direction A, perpendicular to the direction B, parallel to the former connecting surfaces (FIG. 4C) until the axis S of connecting edge 93B of secondary passage 16b and the axis V of the connecting edge 80 of the primary passage 14 are in line (coupling line) with each other, but viewed in axial direction still at a distance from each other (FIG. 4D). During these displacements the valve 78 prevents rest milk from leaking from the primary passage 14.

Figure 4E:
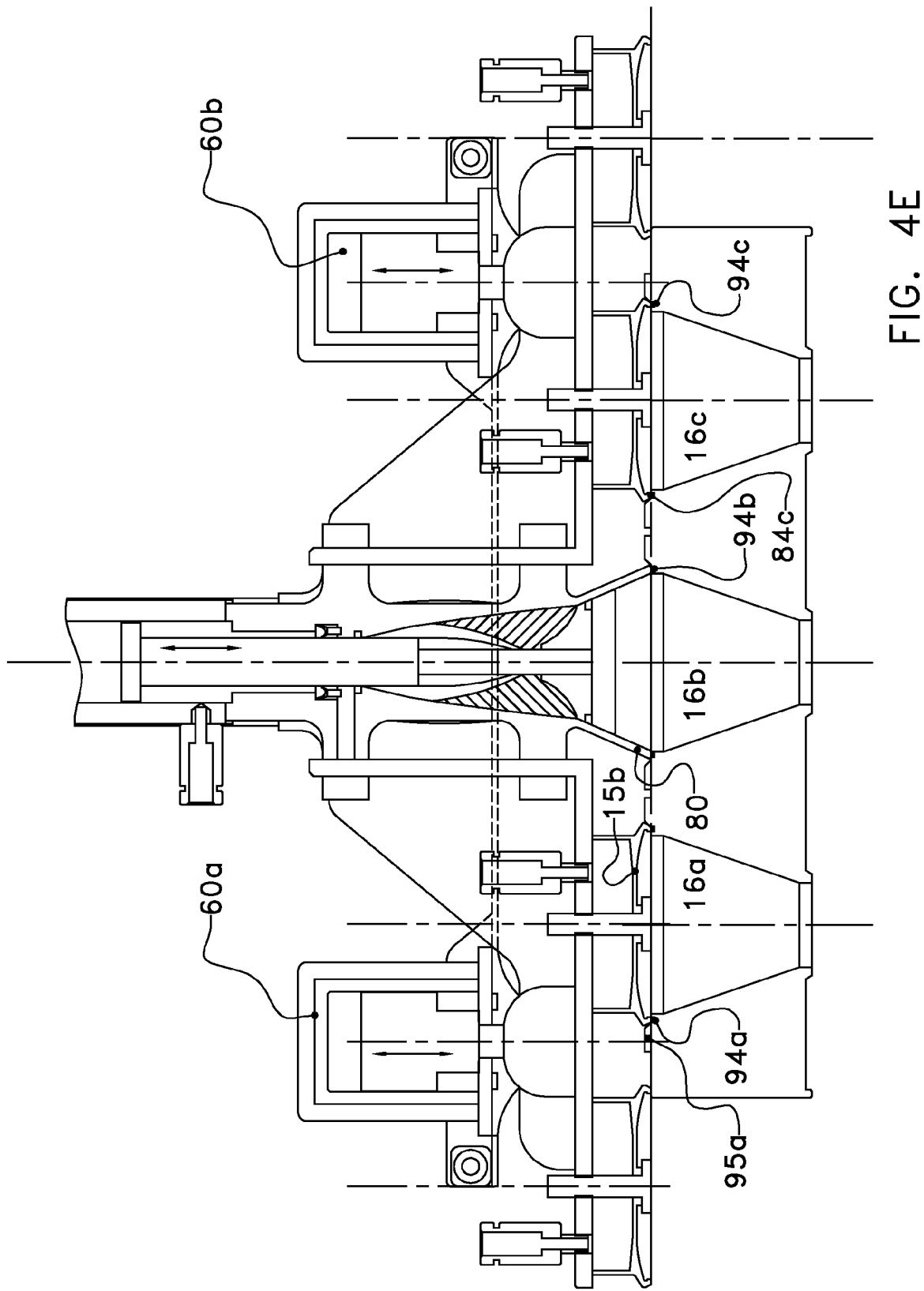

Subsequently, the control unit 20 again operates the cylinders 60a,b, as a result of which the lifting portion 11b is forced in downward direction B to the block 12 (FIG. 4E), along the coupling line, until the closing edges 84b,c are pressed against the seals 93a,c, like the connecting edge 80 against the seal 93b, in the region of respective connecting surfaces. Subsequently the control unit 20 operates the cylinder 71 in order to bring the valve 78 into an open position (FIG. 4F). The teat cups 2 are placed onto the nozzles 27, after which the pump 25 is operated to supply rinsing or cleaning liquid from the storage 24 to the teat cups 2. The rinsing liquid thus flows through the lines 3, the milk jar 4, the central milk line 5 and the primary passage 14 into the secondary passage 16b and through the discharge line 18 to the sewer 22.

In the particular case in which rinsing liquid would still get outside, along the seal 93b, this will not endanger the hygiene in the secondary passage 16c to the milk storage or the secondary passage 16a to the storage 21 for colostrum. In the first place, the secondary passages 16a and 16c will be closed by closing devices 15a and 15c with seals 94a and 94c. If these seals would neither be sufficiently effective, this neither has to lead to a hygiene problem in the passages 16a and 16c, because of the aforementioned open interspaces as a result of which a leak passage is absent. Between the passages, material that would be able to guide leaked liquid from one passage to an adjacent passage is absent. Moreover, an insufficient effectiveness of the seals 94a-c and 80 can quickly be ascertained at sight.

After the rinsing/cleaning of teat cups 2, lines 3, milk jar 4, central milk line 5 and primary passage 14 has been completed, the pump 25 is stopped and the teat cups 2 are removed from the nozzles 27. The control unit 20 operates, in a manner comparable to that described in the foregoing, successively the cylinder 71, the cylinders 60a,b and the cylinder 51a, so that finally the situation of FIG. 4A will be reached again and the device 1 is ready for a new milking.

A comparable procedure can be followed when the primary passage 14 has to be connected to the secondary passage 16a for colostrum. In that case, the cylinder 51b is operated too, in order to displace the carriage 11a a turn further.

The above-mentioned description is included in order to illustrate the operation of preferred embodiments of the invention, and not to limit the scope of the invention. On the basis of the above-mentioned explanation, it will be obvious for a person skilled in the art that there are many variations falling within the spirit and scope of the present invention. For example, it may be chosen to design the two frames in such a manner that the displacement A takes places inside the first frame and the displacement B takes place between the two frames.

Thus, the invention has been described by reference to certain embodiments discussed above. It will be recognized that these embodiments are susceptible to various modifications and alternative forms well known to those of skill in the art. Accordingly, although specific embodiments have been described, these are examples only and are not limiting upon the scope of the invention. The person skilled in the art will be able to apply various modifications and adaptations within the scope of the invention, the scope of protection for the invention being determined by the accompanying claims.

What is claimed is:

1. A closing device assembly for systems for milking animals, comprising:
    at least one primary passage and at least two secondary passages, wherein the primary and secondary passages are provided with first and second connecting edges, respectively, and each passage having an opening with an axis, and
    at least one closing device for at least one unused, non-selected secondary passage, the closing device provided with a closing edge,
    wherein for each set of connecting edges and closing edges to be connected to each other at least one of the edges is provided with a seal, and
    wherein the closing device assembly further comprises:
    a first drive unit for mutual displacement of the first connecting edge and the second connecting edge of a selected secondary passage, from an uncoupled position in which the axes of their openings are not in line with each other to a position in which the axes of their openings are in line with each other to form a coupling line, and
    a second drive unit for bringing the connecting edges against each other.

2. The closing device assembly according to claim 1, wherein the first drive unit is arranged for mutual displacement of the two connecting edges in a direction transverse to the coupling line.

3. The closing device assembly according to claim 1, wherein the second drive unit is arranged for mutual displacement of the two connecting edges in a direction parallel to the coupling line.

4. The closing device assembly according to claim 2, wherein the first drive unit is are arranged for a rectilinear displacement.

5. The closing device assembly according to claim 1, further comprising a control unit for controlling in succession the first and second drive units via an intermediate position in which the axes of the openings of the primary passage and the selected secondary passage are in a coupling line with each other but the two connecting edges of the passages are at a distance from each other.

6. The closing device assembly according claim 1, further comprising a third drive unit for bringing the closing edge and the second connecting edge of the unused secondary passage to a position a distance in front of each other and in line with each other, and a fourth drive unit for bringing the closing edge and the connecting edge against each other.

7. The closing device assembly according to claim 6, further comprising a control unit for controlling in succession the third and fourth drive units.

8. The closing device assembly according to claim 6, wherein the first and third drive units comprise a single drive unit and the second and fourth drive units comprise a single drive unit.

9. The closing device assembly according to claim 6, wherein the second drive unit is arranged to press the connecting edges of the primary and selected secondary passages against each other, and the fourth drive unit is arranged to press the closing edge and the connecting edge of the unused secondary passage against each other.

10. The closing device assembly according to claim 1, comprising a first carrier for carrying the primary passage and the closing device, wherein the first connecting edge and the closing edge are carried by the first carrier, projecting from the first carrier in a spaced arrangement with gaps between the edges.

11. The closing device assembly according to claim 10, comprising a second carrier for carrying the secondary passages, wherein the second connecting edges are carried by the second carrier, projecting from the second carrier in a spaced arrangement with gaps between the edges.

12. The closing device assembly according to claim 11, wherein around the first connecting edge and the closing edge and/or around the second connecting edges a free space is left clear.

13. The closing device assembly according to claim 1, wherein the connecting edge of the primary passage and/or the secondary passage comprises a spout.

14. The closing device assembly according to claim 1, wherein the primary passage is provided with a valve.

15. The closing device assembly according to claim 14, further provided with a fifth drive units for displacing the valve in two opposite directions.

16. The closing device assembly according to claim 15, wherein the fifth drive unit comprises a double-acting cylinder.

17. The closing device assembly according to claim 14, wherein the valve is provided with a drainage duct on its reverse side.

18. The closing device assembly according to claim 1, wherein each closing device is provided with a cover.

19. The closing device assembly according to claim 1, wherein each closing device is provided with a supply of cleaning or rinsing agent at the side of the closing device which faces the secondary passage closed by the closing device.

20. The closing device assembly according to claim 1, provided with a closing device for closing each unused secondary passage.

21. The closing device assembly according to claim 20, wherein on both sides of the primary passage, at least one closing device is provided for closing an unused secondary passage.

22. The closing device assembly according to claim 1, designed as a sliding closing device.

23. A closing device assembly for conduits for fluid flows in a milking device for animals, comprising:

at least one primary port which is connected to a respective source or destination of fluid, and at least two mutually parallel secondary ports which are each connected to respective sources or destinations of fluid, wherein the primary port is provided on a first closing device portion and the secondary ports are provided on a second closing device portion, wherein the primary port and the secondary port are provided with primary and secondary openings, respectively, which are connectable to each other at their edges along a respective connecting surface, wherein the first closing device portion is provided with at least one closing device for closing an unused one of the secondary ports, wherein at least one of the ports and/or the closing device is provided with a seal, the closing device further comprising first drive unit for displacing the two closing device portions with respect to each other in a first direction with a direction component parallel to the connecting surface and a second drive unit for displacing the two closing device portions with respect to each other in a second direction with a direction component perpendicular to the connecting surface.

24. The closing device assembly according to claim 23, wherein the second drive unit is arranged to press the two closing device portions towards each other.

25. The closing device assembly according to claim 23, wherein the first direction is parallel to the connecting surface.

26. The closing device assembly according to claim 24, wherein the second direction is perpendicular to the respective connecting surface.

27. The closing device assembly according to claim 23, wherein the first closing device portion comprises a frame which carries the closing device and the primary port, wherein the closing device has an edge which co-operates in a closing manner with an opening edge of a secondary port, and wherein there is a gap between the edge of the closing device and the opening edge of the primary port.

28. The closing device assembly according to claim 23, wherein the second closing device portion comprises a frame which carries the secondary ports, and wherein there is a gap between the edges of the secondary ports.

29. A closing device assembly for conduits for fluid flows in a milking device for animals, comprising:

at least one primary port which is connected to a respective source or destination of fluid and at least two mutually parallel secondary ports which are each connected to respective sources or destinations of fluid, and a drive system for selectively connecting the primary port to one of the secondary ports, wherein in the connected position the respective primary and secondary port define a mutual connecting surface in which a seal is provided, and wherein the drive system is arranged for mutual displacement of the ports to be connected to each other with a first direction of approach parallel to the connecting surface and a second direction of approach perpendicular to the connecting surface.

30. The closing device assembly according to claim 29, wherein the drive system is arranged to provide the displacement along the first direction of approach followed by the displacement along the second direction of approach.

31. A closing device assembly for conduits for fluid flows in a milking device for animals, comprising:

at least one primary port which is connected to a respective source or destination of fluid and at least two mutually parallel secondary ports which are each connected to respective sources or destinations of fluid, wherein the primary port is provided on a first closing device portion and the secondary ports are provided on a second closing device portion, wherein the primary port and the secondary port are provided with primary and secondary openings, respectively, which are connectable to each other at their edges, wherein the first closing device portion is provided with at least one closing device for closing an unused secondary port, wherein the closing device has an edge which is able to co-operate in a closing manner with the opening edge of a secondary port, wherein at least one of the primary and secondary ports to be connected to each other and at least one of the closing means and the secondary port to be closed thereby is provided with a seal, wherein the first closing device portion comprises a frame which carries the closing device and the primary port, and wherein there is a gap between the edges of the closing device and the opening edge of the primary port.

32. The closing device assembly according to claim 31, wherein the second closing device portion comprises a frame which carries the secondary ports, and wherein there is a gap between the opening edges of the secondary ports.

33. The closing device assembly according to claim 31, wherein the primary and secondary openings are connectable to each other at their edges along a respective connecting surface, the closing device further comprising a first drive unit for displacing the two closing device portions with respect to each other in a first direction with a direction component parallel to the connecting surface, and a second drive unit for displacing the two closing device portions with respect to each other in a second direction with a direction component perpendicular to the connecting surface.

34. The closing device assembly according to claim 33, wherein the primary port or passage is an inlet port and the secondary ports or passages are outlet ports.

35. The closing device assembly according to claim 34, wherein the primary port or passage is selectively connectable to an animal to be milked and to a supply for cleaning or rinsing fluid.

36. The closing device assembly according to claim 34, wherein one secondary port or passage is connected to a conduit to a milk storage container and another secondary port or passage is connected via a conduit to a discharge point.

37. The closing device assembly according to claim 34, wherein the secondary ports or passages are stationary.

* * * * *